(12) United States Patent
Linstid, III et al.

(10) Patent No.: US 6,294,640 B1
(45) Date of Patent: Sep. 25, 2001

(54) STRETCHABLE POLYMERS AND SHAPED ARTICLES PRODUCED BY SAME

(75) Inventors: H. Clay Linstid, III, Clinton; Dominick L. Cangiano, Neshanic; Ronald N. DeMartino, Wayne; James E. Kuder, Fanwood; Vincent J. Provino, Clifton, all of NJ (US); Randy Jester, Greer, SC (US)

(73) Assignee: Ticona LLC, Summit, NJ (US)

( * ) Notice: Subject to any disclaimer, the term of this patent is extended or adjusted under 35 U.S.C. 154(b) by 0 days.

(21) Appl. No.: 09/648,147

(22) Filed: Aug. 25, 2000

Related U.S. Application Data

(63) Continuation-in-part of application No. 09/483,103, filed on Jan. 14, 2000, now Pat. No. 6,222,000.

(51) Int. Cl.$^7$ .................................................. C08G 63/00
(52) U.S. Cl. .............................................................. 528/190
(58) Field of Search ............................................. 528/190

(56) References Cited

U.S. PATENT DOCUMENTS

| | | | |
|---|---|---|---|
| 4,351,918 | 9/1982 | Charbonneau et al. | 524/602 |
| 4,473,682 | 9/1984 | Calundann et al. | 524/605 |
| 4,522,974 | 6/1985 | Calundann et al. | 524/605 |
| 4,563,308 | 1/1986 | Cottis et al. | 525/444 |
| 4,563,508 | 1/1986 | Cottis et al. | 525/444 |
| 4,684,712 | 8/1987 | Ueno et al. | 528/190 |
| 4,722,993 | 2/1988 | Hisgen et al. | 528/183 |
| 4,912,193 | 3/1990 | Dicke et al. | 528/193 |
| 4,918,154 | 4/1990 | Hayashi et al. | 528/190 |
| 4,920,197 | 4/1990 | Hayashi et al. | 528/190 |
| 4,937,310 | 6/1990 | Hayashi et al. | 528/193 |
| 4,966,956 | 10/1990 | Andreu et al. | 528/185 |
| 4,983,713 | 1/1991 | Hayashi et al. | 528/190 |
| 5,025,082 | 6/1991 | Kishiro et al. | 528/190 |
| 5,037,939 | 8/1991 | Eckhardt et al. | 528/193 |
| 5,055,546 | 10/1991 | Sugimoto et al. | 528/193 |
| 5,066,767 | 11/1991 | Matzner et al. | 528/193 |
| 5,089,594 | 2/1992 | Stern et al. | 528/194 |
| 5,125,818 | 6/1992 | Yeh | 425/131.5 |
| 5,162,074 | 11/1992 | Hills | 156/644 |
| 5,171,823 | 12/1992 | Charbonneau et al. | 528/193 |
| 5,204,443 | 4/1993 | Lee et al. | 528/184 |
| 5,344,297 | 9/1994 | Hills | 425/131.5 |
| 5,399,656 | 3/1995 | Nitta et al. | 528/193 |
| 5,445,884 | 8/1995 | Hoyt et al. | 428/370 |
| 5,508,374 | 4/1996 | Lee et al. | 528/184 |
| 5,525,700 | 6/1996 | Samuels et al. | 528/190 |
| 5,618,479 | 4/1997 | Lijten et al. | 264/103 |
| 5,656,714 | 8/1997 | Shen et al. | 528/193 |
| 5,663,276 | 9/1997 | Yoneta et al. | 528/194 |
| 5,798,432 | 8/1998 | Lee et al. | 528/176 |
| 5,948,528 | 9/1999 | Helms, Jr. et al. | 428/373 |
| 6,074,590 | 6/2000 | Gownder | 264/172.12 |

FOREIGN PATENT DOCUMENTS

| | | |
|---|---|---|
| 0909781A2 | 4/1999 | (EP) . |
| 0911150A2 | 4/1999 | (EP) . |
| 0928683A2 | 7/1999 | (EP) . |

*Primary Examiner*—Terressa M. Boykin
(74) *Attorney, Agent, or Firm*—Karen E. Klumas

(57) ABSTRACT

A stretchable liquid crystal polymer having recurring units derived from p-hydroxybenzoic acid, 6-hydroxy-2-naphthoic acid, at least one aromatic diacid and at least one aromatic diol and/or hydroxyamine component, at least a portion of which is 4,4'-biphenol, and one or more aromatic monomers that provide the polymers with selected 1,3-(meta-) linkages. Stretchable polymers are especially suitable for multilayer laminates and bicomponent fibers.

30 Claims, No Drawings

STRETCHABLE POLYMERS AND SHAPED ARTICLES PRODUCED BY SAME

RELATED APPLICATIONS

The following application is a continuation-in-part of copending U.S. application Ser. No. 09/483,103 filed on Jan. 14, 2000 now U.S. Pat. No. 6,222,000.

BACKGROUND OF THE INVENTION

1. Field of the Invention

The present invention relates to a process for producing highly stretchable amorphous anisotropic melt-forming polymers suitable for use in the production of a variety of shaped articles including films, fibers, and blow molded forms. This invention also relates to the polymers produced from the subject process, as well as to shaped articles, such as multilayer laminates and bicomponent fibers, made from the polymers.

2. Description of the Prior Art

Anisotropic melt-forming polymers, also known as liquid crystalline polymers or "LCPs", are well known in the art. Anisotropic melt-forming polymers exhibit a parallel ordering of molecular chains in the melt phase and are also termed "thermotropic" liquid crystal polymers. Many of these materials are wholly aromatic in nature.

Thermotropic polymers include aromatic copolyesters having recurring units derived from p-hydroxybenzoic acid, at least one aromatic diol and at least one aromatic dicarboxylic acid as well as wholly aromatic copolyesteramides having recurring units derived from p-hydroxybenzoic acid, at least one aromatic diol, at least one aromatic diacid, and aminophenol. Without the inclusion of recurring units that disrupt the crystalline structure, such polymers tend to have very high melting points, for example, 360° C. and above, making them difficult to melt fabricate. Incorporation of recurring units that provide non-parallel or "kinky" linkages is a common means of lowering melting point. These kinky linkages include "meta" or 1,3-aromatic ring structures.

Common materials from which meta linkages are derived include m-hydroxybenzoic acid, isophthalic acid, resorcinol, and m-aminophenol. U.S. Pat. Nos. 4,563,508; 5,037,939; and 5,066,767 disclose polymers containing recurring units derived from p-hydroxybenzoic acid, terephthalic acid, isophthalic acid, hydroquinone and 4,4'-biphenol; U.S. Pat. No. 4,912,193 discloses polymers having recurring units derived from p-hydroxybenzoic acid, 4,4'-biphenol, terephthalic acid and isophthalic acid; U.S. Pat. No. 4,966,956 discloses polymers having recurring units derived from p-hydroxybenzoic acid, terephthalic acid, isophthalic acid, 4,4'-biphenol and aminophenol; U.S. Pat. No. 5,663,276 discloses polymers having recurring units derived from p-hydroxybenzoic acid, terephthalic acid, 4,4'-biphenol, isophthalic acid, hydroquinone and 4,4'-biphenyldicarboxylic acid; U.S. Pat. No. 5,089,594 discloses polymers having recurring units derived from p-hydroxybenzoic acid, terephthalic acid, isophthalic acid, 4,4'-biphenol, and an aromatic diol, for example, hydroquinone; U.S. Pat. No. 4,722,993 discloses polymers having recurring units derived from m-aminophenol, p-hydroxybenzoic acid, terephthalic and/or isophthalic acid, one or more of hydroquinone, 4,4'-biphenol or resorcinol and, if desired, m-hydroxybenzoic acid; U.S. Pat. No. 5,399,656 discloses polymers having recurring units derived from p-hydroxybenzoic acid, terephthalic acid, resorcinol and an aromatic diol, for example, 4,4'-biphenol; U.S. Pat. No. 5,025,082, discloses polymers having recurring units derived from p-hydroxybenzoic acid, terephthalic acid, 4,4'-biphenol, 2,6-naphthalene dicarboxylic acid, and at least one aromatic diol selected from hydroquinone, methylhydroquinone, trimethylhydroquinone, resorcinol and tetramethylbiphenol; and U.S. Pat. No. 5,798,432 discloses polymers having requiring units derived from p-hydroxy benzoic acid, 2,6-naphthalene dicarboxylic acid, terephthalic acid, isophthalic acid, hydroquinone, p-aminophenol and 4,4'-biphenol.

The presence of meta linkages notwithstanding, aromatic polymers derived from p-hydroxybenzoic acid, at least one aromatic dicarboxylic acid and at least one aromatic diol and/or aminophenol tend to have highly ordered crystalline structures and, although drawable in the melt, generally lack the ability to be stretched to a significant degree at temperatures below the molten state.

Another class of thermotropic polymers has recurring units derived from p-hydroxybenzoic acid, 6-hydroxy-2-naphthoic acid, at least one aromatic diacid and at least one aromatic diol. The incorporation of meta linkages into such polymers is described, for example, in the following: U.S. Pat. No. 4,522,974 disclosing polymers having recurring units derived from p-hydroxy benzoic acid, 6-hydroxy-2-naphthoic acid, hydroquinone and isophthalic and/or terephthalic acid; U.S. Pat. No. 4,920,197 disclosing polymers having recurring units derived from p-hydroxybenzoic acid, 6-hydroxy-2-naphthoic acid, terephthalic acid, isophthalic acid and resorcinol; U.S. Pat. No. 4,937,310 disclosing polymers having recurring units derived from p-hydroxybenzoic acid, 6-hydroxy-2-naphthoic acid, terephthalic acid, isophthalic acid and resorcinol; U.S. Pat. No. 4,918,154 disclosing polymers having recurring units derived from p-hydroxybenzoic acid, 6-hydroxy-2-naphthoic acid, terephthalic and/or isophthalic acid, resorcinol and hydroquinone; and U.S. Pat. No. 4,983,713 disclosing polymers having recurring units derived from p-hydroxybenzoic acid, 6-hydroxy-2-naphthoic acid, terephthalic acid, 4,4'-biphenol, and isophthalic acid. The polymers set forth in the examples of these patents tend to have ordered crystalline structures and are not considered to be highly stretchable materials.

More recent patents disclose liquid crystalline polymers that include amorphous materials. Example 5 of U.S. Pat. No. 5,525,700 is directed to what appears to be an amorphous polymer having recurring units derived from p-hydroxybenzoic acid, 6-hydroxy-2-naphthoic acid, hydroquinone, terephthalic acid, 4,4'-biphenol and 2,6-naphthalene dicarboxylic acid. Crystalline polymers derived from the same recurring units are also disclosed. In fact, of the numerous polymers exemplified by this patent, all but Example 5 are crystalline materials. Example 5 is not believed to be a highly stretchable polymer.

U.S. Pat. No. 5,656,714 discloses amorphous and what are termed "semi-crystalline" polymers having recurring units derived from p-hydroxybenzoic acid, 6-hydroxy-2-naphthoic acid, terephthalic acid, 4,4'-biphenol, and resorcinol. Fibers made from the amorphous polymers of Examples I and IX were respectively reported to be drawn to 73 and 30 times their as-spun length. Apart from Examples I and IX, no additional data regarding the stretchability of the exemplified polymers is provided. The polymers exemplified by U.S. Pat. No. 5,656,714 vary in terms of their degree of crystallinity; some, but not all, of these polymers are highly stretchable.

LCPs that are stretchable at lower temperatures have a diverse range of end-use applications. Amorphous LCPs having a Tg (i.e., onset of the glass transition temperature as measured by differential scanning calorimetry or "DSC") of 150° C. or less that are highly stretchable at temperatures above Tg, but below the temperature at which the LCP is in the molten state, are of particular interest in the production of articles that are stretched, drawn or otherwise processed at lower temperatures. Liquid crystalline polymers that are stretchable at temperatures below the processing temperatures of conventional film-forming polymers such as, for example, polyolefins or polyalkene terephthalates, for example, PBT or PET, may be particularly desirable for use in the production of multilayer articles such as films, laminates, blow-molded containers, and the like. In these multi-layer applications, the barrier, mechanical and/or optical properties of liquid crystalline polymers may provide advantages that are typically not obtained from conventional thermoplastics. EP 0 928 683 A2, published Jul. 14, 1999, discloses a variety of multi-layer laminates, including laminates formed from wholly aromatic, liquid crystalline polymers of the type disclosed in U.S. Pat. No. 5,656,714.

A process for producing highly stretchable amorphous LCPs and the LCPs so produced are desired.

SUMMARY OF THE INVENTION

It now been found that in order to produce highly stretchable amorphous anisotropic polymers, it is necessary to provide the polymer with specific recurring units in narrowly defined amounts. In one embodiment, the present invention is directed to a process for forming highly stretchable, amorphous anisotropic melt-forming polymers which comprises incorporating recurring unit V selected from the group consisting of:

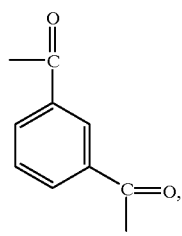

(Va)

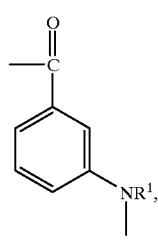

(Vb)

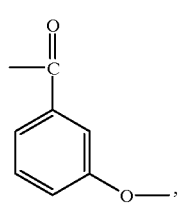

(Vc)

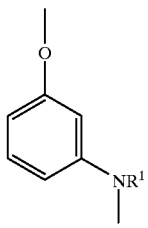

(Vd)

and mixtures thereof, wherein $R^1$ is independently selected from the group consisting of hydrogen and $C_1$ to $C_6$ alkyl, into a polymer comprising recurring units I, II, III, and IV, wherein recurring unit I is

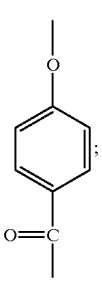

I recurring unit II is:

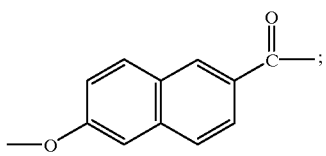

II recurring unit III is:

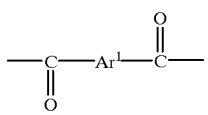

III wherein $Ar^1$ is selected from the group consisting of:

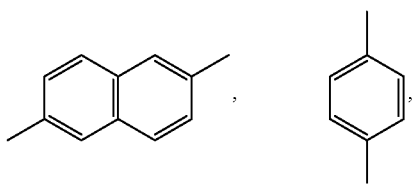

and mixtures thereof;
and recurring unit IV is:

IV

—O—Ar²—X— wherein Ar² is selected from the group consisting of:

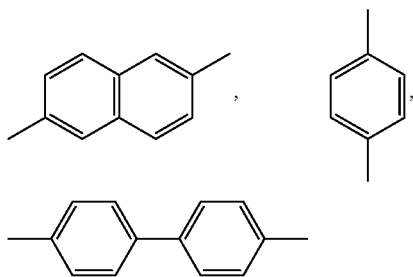

and mixtures thereof, and X is independently selected from the group consisting of O and NR² wherein R² is independently selected from the group consisting of hydrogen and $C_1$ to $C_6$ alkyl; to provide a polymer that consists essentially of from about 15 to about 60 mole percent of recurring unit 1, from about 15 to about 60 mole percent of recurring unit II, from about 5 to about 20 mole percent of recurring unit III, from about 5 to about 30 mole percent of recurring unit IV, and from about 7 to about 15 mole percent of recurring unit V, wherein:
(a) recurring units I and II combined are present in the polymer in an amount of from about 50 to about 75 mole percent, and
(b) the polymer contains at least about 5 mole percent of recurring units of the formula:

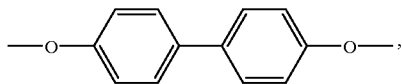

with the proviso that recurring unit II is present in the polymer in an amount of at least about 30 mole percent, if and when the polymer also contains unit V:

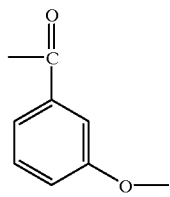

in combination with a total of from 0 to about 5 mole percent of units selected from the group consisting of units (Va), (Vb) and (Vd), and mixture thereof.

In a further embodiments this invention is directed to anisotropic melt-forming polymers produced in accordance with the process described in the immediately preceding paragraph as well as to stretched articles formed from such polymers.

DETAILED DESCRIPTION OF THE INVENTION

The process of this invention produces highly stretchable amorphous polymers. The polymers are considered to be amorphous in that they lack a well-defined melting point or $T_m$ (i.e., a solid to nematic endothermic peak as measured by differential scanning calorimetry). Despite the absence of a classic melting point, the subject polymers possess a solid to nematic fluid transition temperature that defines their melt processability. Polymers produced in accordance with this invention are melt processable at temperatures below about 270° C. Additionally, such polymers have $T_g$ values of about 150° C. or less. Preferably, the polymers have $T_g$ values of about 130° C. or less, most preferably about 120° C. or less. For co-extrusion applications with polyolefins, polymers that are melt processable at temperatures at or below 220° C. are of particular interest.

As noted above, the thermal properties of liquid crystalline polymers vary with composition. While almost all liquid crystalline polymers are stretchable in the melt, relatively few are stretchable at temperatures below which they are molten. The extent to which a polymer can be stretched or drawn depends upon the temperature at which stretching occurs as well as the form and size of the material that is being stretched. LCPs of the subject invention exhibit a percentage of break strain at break point (herein also referred to as the polymer's degree of stretchability) of at least about 100% when spun into tapes that are tested in accordance with the procedure set forth in the Examples below. In the present application, the term "stretchable" polymer means that tapes made from the polymer are capable of being stretched to at least 100% elongation (i.e., 100% break strain) before the break or rupture point of the tapes according to the procedure specified in the Examples below. Several polymers produced in accordance with this invention have a degree of stretchability of at least about 200% and, in some cases, at least about 300%.

Anisotropic melt-phase forming polymers formed by the present invention consist essentially of at least five different recurring units. Unit I of the subject polymers, termed a para-oxybenzoyl unit, possesses the structural formula:

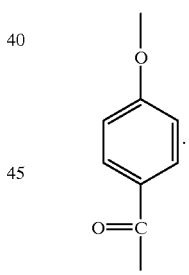

While not specifically illustrated in the structural formula, at least some of the hydrogen atoms present on the aromatic ring of unit I may be substituted. Included among the representative precursors from which recurring unit I may be derived are: 4-hydroxybenzoic acid; 3-chloro-4-hydroxybenzoic acid; 3-methyl-4-hydroxybenzoic acid; 3-methoxy-4-hydroxybenzoic acid 3-phenyl-4-hydroxybenzoic acid; 3,5-dichloro-4-hydroxybenzoic acid; 3,5-dimethyl-4-hydroxybenzoic acid; 3,5-dimethoxy-4-hydroxybenzoic acid; and the like. In a preferred embodiment, no ring substitution is present on recurring unit I. Recurring unit I is present in the polymers of the subject invention in an amount of from about 15 to about 60 mole percent, preferably from about 20 to about 40 mole percent.

Recurring unit II of the subject polymers, termed a 6-oxy-2-naphthoyl unit, possesses the structural formula:

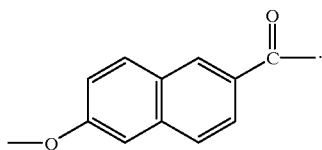

As in the case of recurring unit I, at least some of the hydrogen atoms present on the aromatic ring structure of recurring unit II may be substituted. Exemplary of such substituents are alkyl groups of 1 to 4 carbon atoms, alkoxy groups of 1 to 4 carbon atoms, phenyl, halogen (e.g., Cl, Br, and I), and mixtures thereof. Representative of the precursors from which recurring unit II may be derived are aromatic hydroxy-naphthoic acids which include: 6-hydroxy-2-naphthoic acid; 6-hydroxy-5-chloro-2-naphthoic acid; 6-hydroxy-5-methyl-2-naphthoic acid; 6-hydroxy-5-methoxy-2-naphthoic acid; 6-hydroxy-5-phenyl-2-naphthoic acid; 6-hydroxy-7-chloro-2-naphthoic acid; 6-hydroxy-5,7-dichloro-2-naphthoic acid, and the like. In a preferred embodiment no ring substitution is present on recurring unit II. Recurring unit II is present in the subject polymers in an amount of from about 15 to about 60 mole percent, preferably from about 20 to about 40 mole percent, except when recurring unit V constitutes significant amounts of meta-oxybenzoyl units and little or no additional meta units, in which case unit II shall be present in an amount of from about 30 to about 60 mole percent. Additionally, recurring units I and II combined constitute from about 50 to about 75 mole percent, preferably about 60 to about 70 mole percent of the subject polymers.

Recurring unit III of the subject polymers possesses the structural formula:

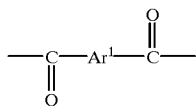

wherein $Ar^1$ is a divalent radical selected from the group consisting of:

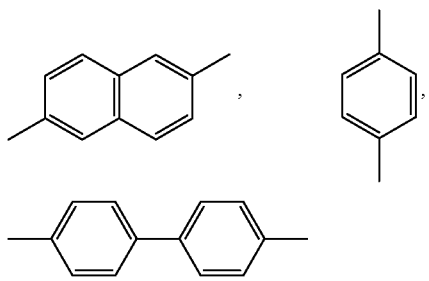

and mixtures thereof. Although not specifically shown in the formulas given, the aromatic ring structure of recurring unit III may be substituted in a manner similar to that described for recurring unit I. Preferably no ring substitution is present in recurring unit III. Representative of the precursors from which recurring unit III may be derived are aromatic diacids such as, for example, terephthalic acid, 2,6-naphthalene dicarboxylic acid, 4,4'-biphenyldicarboxylic acid, and the like. In a preferred embodiment no ring substitution is present on recurring unit III. Recurring unit III is present in the polymers of the subject invention in an amount of from about 5 to about 20 mole percent, preferably from about 10 to about 15 mole percent. In one embodiment of interest, recurring unit III consists of units of the formula:

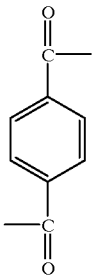

In another embodiment interest, recurring unit III consists of units of the formula:

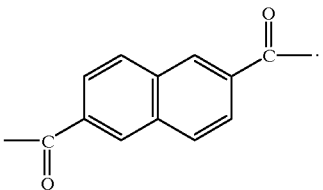

In yet another embodiment of interest, recurring unit III consists of units selected from the group consisting of:

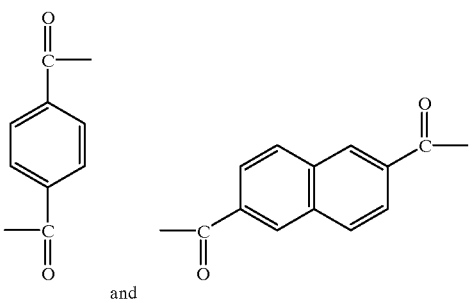

and and mixtures thereof.

Recurring unit IV of the subject polymers, possesses the formula:

$$—O—Ar^2—X—$$

wherein $Ar^2$ and X are as previously defined. Although not specifically illustrated in the structural formula given, the aromatic ring structure of recurring unit IV may be substituted in a manner similar to that described for recurring unit I. Representative of the precursors from which recurring unit IV may be derived are aromatic diols such as, for example, 4,4'-biphenol, hydroquinone, 2,6-naphthalene diol, p-aminophenol, and the like. Preferably, no ring substitution is present on recurring unit IV. Recurring unit IV is present in the polymers of the subject invention in an amount of from about 5 to about 30 mole percent, preferably from about 20 to about 30 mole percent. In the practice of this invention, the subject polymers contain at least about 5 mole percent of recurring units of the formula:

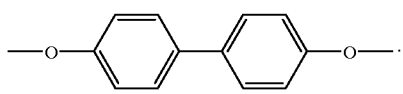

In one embodiment of particular interest recurring unit IV consists of units of the formula:

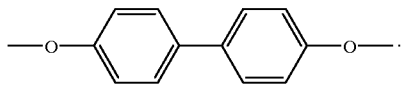

In another embodiment of interest, recurring unit IV consists of a mixture of the following:

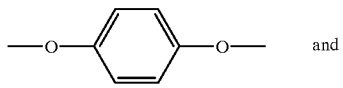 and

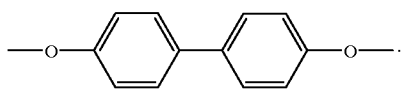

Recurring unit V of the subject polymers is selected from the group consisting of:

(Va)

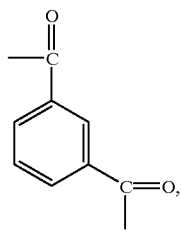

(Vb)

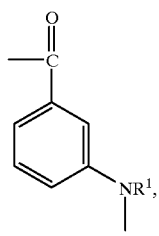

(Vc)

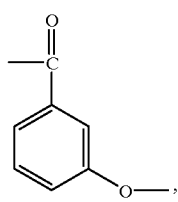

(Vd)

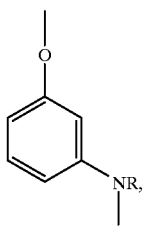

and mixtures thereof, wherein $R^1$ is independently selected from the group consisting of hydrogen and $C_1$ to $C_6$ alkyl. Although not specifically illustrated in the structural formulas given, the aromatic ring structure of recurring unit V may be substituted in a manner similar to that described for recurring unit I. Preferably no ring substitution is present on recurring unit V. Included among the representative precursors from which recurring unit V may be derived are: isophthalic acid, m-aminophenol, m-hydroxybenzoic acid, and m-aminobenzoic acid. In the practice of this invention, recurring unit V is present in the subject polymer in an amount of from about 7 to about 15 mole percent, preferably from about 10 to about 15 mole percent.

The choice of recurring unit V and relative amounts of the various constituent monomers are factors that affect the thermal properties, including melt processability and stretchability of the subject polymers. When recurring unit V is an isophthaloyl moiety:

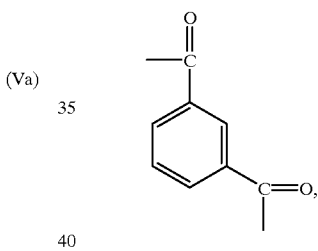

the resulting polymers tend to have $T_g$ values under 120° C. When the isophthaloyl moiety that is present in an amount of from about 10 to about 15 mole percent, the resulting polymers typically exhibit particularly high degrees of stretchability.

When recurring unit V is a meta-oxybenzoyl unit:

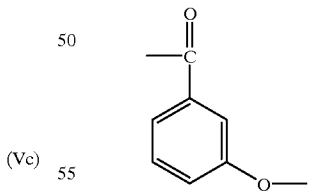

the resulting polymers tend to have $T_g$ values under 120° C. However, meta-oxybenzoyl recurring units may not have as intense an effect on stretchability as isophthaloyl units. It has been found that when recurring unit V constitutes significant amounts of meta-oxybenzoyl units and a little or no additional meta units, a minimum of about 30 mole percent of recurring unit II should also be present for the polymer to be highly stretchable.

When recurring unit V is a moiety that introduces an esteramide linkage to the resultant polymer, i.e., when recurring unit V is:

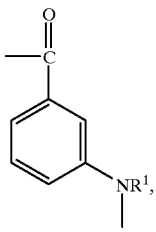

termed a meta-aminobenzyol moiety, or

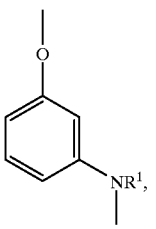

termed a 1,3-oxyaminobenzene moiety, the $T_g$ values of the resultant polymers tend to be greater than that of similar polymers wherein recurring unit V consists of isophthaloyl or meta-benzoyl units. The solid to nematic transition temperature of polymers having such esteramide linkages is also increased, as well as the processing temperature thereof.

When lower $T_g$ values are desired, recurring unit V is preferably selected from the group consisting of:

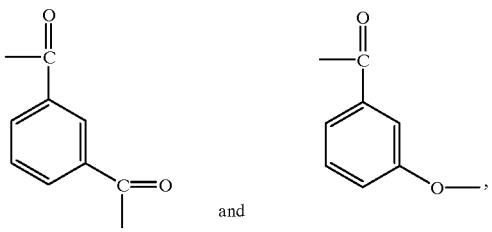

and mixtures thereof.

Minor amounts of other units that provide ester or esteramide linkages may be present provided, that such units, do not obviate the properties desired by this invention. It will be apparent to those skilled in the art that the total amount of dioxy and oxy-amino units present in the subject polymers will be substantially equal to the total amount of dicarboxy units. In general, the various recurring units will be present in the resultant polymers in a random configuration. Preferably the polymers are wholly aromatic materials.

The polymers formed by the process of this invention commonly exhibit a weight average molecular weight of from about 10,000 to about 80,000. The molecular weight of preference will depend, in part, on the intended end-use application. For example, in fiber and film applications, weight average molecular weights of from about 20,000 to about 40,000 are commonly of interest. The polymers typically exhibit an inherent viscosity (I.V.), measured at 25° C. as a 0.1% by weight solution of polymer in a mixture of equal volumes of pentafluorophenol and hexafluoroisopropanol, of at least about 1.0 dl/g, with polymers having inherent viscosities of from about 3.0 dl/g to about 7.0 dl/g being of particular interest.

Characteristic of the subject polymers is the formation of an anisotropic melt phase. Thus, in the melt there is a tendency for the polymer chains to orient in the shear direction. Such thermotropic properties are manifest at a temperature which is amenable for melt processing to form shaped articles. Anisotropy in the melt may be confirmed by conventional polarized light microscopy techniques.

The polymers of this invention are typically prepared by a polymerization reaction that proceeds through the acetate form of the hydroxycarboxylic acid, amino-carboxylic acid, diol and, when present, hydroxyamine and amino-carboxylic acid reactants. Thus, it is possible to employ as starting materials reactants having pre-acetylated hydroxyl groups and amino groups, heat the reaction mix to polycondensation temperature and maintain reaction until a desired polymer viscosity is reached. Alternatively, it is possible to acetylate in situ, in which case the aromatic hydroxycarboxylic acid, aromatic diol and, when present, hydroxyamine and aminocarboxylic acid are reacted with acetic anhydride, acetic acid by-product is removed, the esterified reactants together with the aromatic diacid are heated to polycondensation temperature, and reaction is maintained until a desired polymer viscosity is reached. The aromatic diacid reactant may, but need not, be present during the acetylation reaction. If the acetylation and polycondensation reactions are conducted in a single reactor, it is common to charge the reactor with the reactant materials in a single step.

Using separate acetylation and polymerization reactors, it may be desirable to introduce the diacid component to the polymerization reactor as opposed to the acetylation reactor. The acetylation and polycondensation reactions are typically conducted in the presence of suitable catalysts. Such catalysts are well known in the art and include, for example, alkali and alkaline earth metal salts of carboxylic acids, such as, for example, potassium acetate, sodium acetate, magnesium acetate, and the like. Such catalysts are typically used in amounts of from about 50 to about 500 parts per million based on the total weight of the recurring unit precursors.

Acetylation is generally initiated at temperatures of about 90° C. In the initial stage of the acetylation reflux is desirably employed to maintain vapor phase temperature below the point at which acetic acid byproduct and anhydride begin to distill. Temperatures during the initial stage of acetylation typically range from between 90° to 150° C., preferably about 100° to about 130° C. In order to complete the acetylation, the reaction mixture is then heated to final melt temperature of about 150° to about 220° C., preferably about 150° to about 200° C., with temperatures of 180° to 200° C. being of particular interest. At this point, if reflux is used, the vapor phase temperature should exceed the boiling point of acetic acid but remain low enough to retain residual acetic anhydride.

To ensure substantially complete reaction, it may be desirable to utilize an excess amount of acetic anhydride in conducting the acetylation. The amount of excess anhydride utilized will vary depending upon the particular acetylation conditions employed, including the presence or absence of reflux. The use of an excess of from about 1 to about 10 mole percent of acetic anhydride, based on the total moles of reactant hydroxyl groups present is not uncommon.

To obtain both complete acetylation and maintenance of stoichiometric balance, anhydride loss should be minimized.

Acetic acid vaporizes at temperatures of about 118° C. At higher temperatures, i.e., about 140° C. acetic anhydride also begins to vaporize. Providing the reactor with a means of controlling vapor phase reflux is desirable. Maintaining vapor phase reflux temperature at about 120° to about 130° C. is particularly desirable.

Polycondensation of the acetylated starting materials generally begins to take place at a temperature within a range of from about 210° to about 260° C. As acetic acid is also a byproduct of the polymerization reaction, it is desirable to employ controlled vapor phase reflux when conducting the polycondensation reaction. In the absence of controlled vapor phase reflux, acetic anhydride, acetoxybenzoic acid and other volatile materials are vaporized as the polymerization temperature is increased. Depending on the particular polymer synthesized, it is preferable to maintain vapor phase reflux temperatures of about 120° to about 130° C. during the polymerization reaction.

As the final polymerization temperature is approached, volatile byproducts of the reaction having boiling points above that of acetic acid and acetic anhydride should be removed. Accordingly at reactor temperatures of about 250° to about 300° C., vapor phase reflux, if used, is generally adjusted to allow higher vapor phase temperatures or is discontinued. The polymerization is generally allowed to proceed until a desired polymer viscosity is reached. To build molecular weight in the melt, the polymerization reaction is generally conducted under vacuum, the application of which facilitates the removal of volatiles formed during the final stage of the polycondensation.

Following polymerization, the molten polymer is discharged from the reactor, typically through an extrusion orifice fitted with a die of desired configuration; cooled; and collected. Commonly, the melt is discharged through a perforated die to form strands which are taken up in a water bath, pelletized and dried.

In an embodiment of particular interest this invention is directed to highly stretchable, amorphous anisotropic melt-forming polymers consisting essentially of recurring units I, II, III, IV and V, wherein recurring unit I is

I

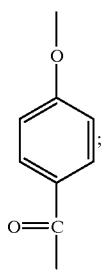

recurring unit II is:

II

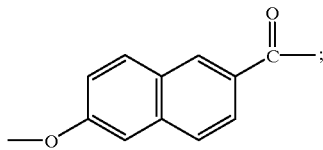

recurring unit III is:

III

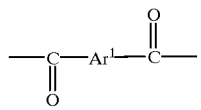

wherein is $Ar^1$ is selected from the group consisting of:

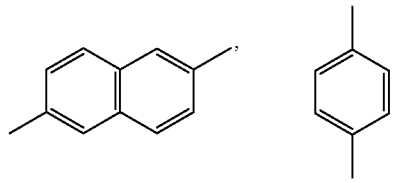

and mixtures thereof;

recurring unit IV is:

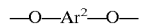

wherein $Ar^2$ is selected from the group consisting of:

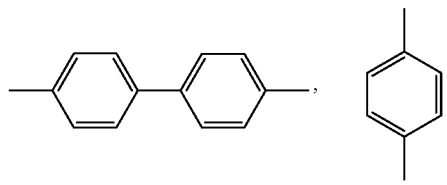

and mixtures thereof; and recurring unit V is selected from the group consisting of:

(Va)

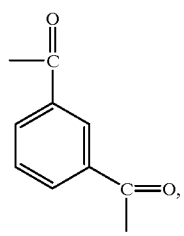

(Vb)

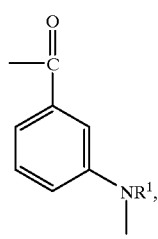

-continued (Vc)

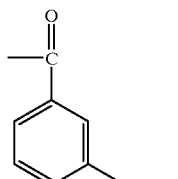

(Vd)

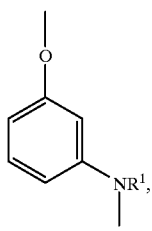

and mixtures thereof, wherein $R^1$ is hydrogen, and wherein said polymer consists essentially of from about 20 to about 40 mole percent of recurring unit I, from about 20 to about 40 mole percent of recurring unit II, from about 10 to about 15 mole percent of recurring unit III, from about 5 to about 30 mole percent of recurring unit IV, and from about 10 to about 15 mole percent of recurring unit V and wherein:

(a) recurring units I and II combined are present in the polymer in an amount of from about 60 to about 70 mole percent, (b) the polymer contains at least about 5 mole percent of recurring units of the formula:

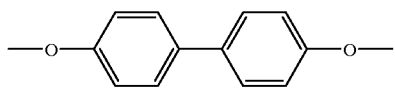

and (c) the polymer contains at least about 5 mole percent of recurring units of the formula:

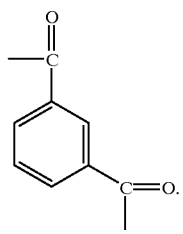

In one preferred embodiment this invention is directed to highly stretchable, amorphous anisotropic melt-forming polymers consisting essentially of recurring units I, II, m, IV and V, wherein recurring unit I is

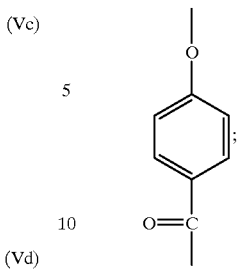

recurring unit II is:

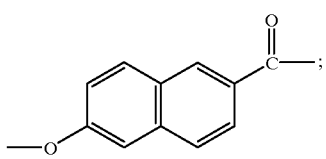

recurring unit III is:

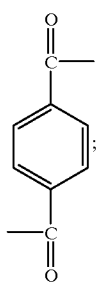

recurring unit IV is:

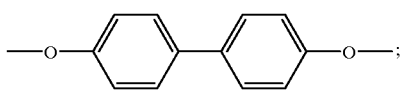

and recurring unit V is:

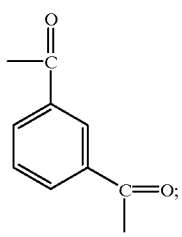

wherein said polymer consists essentially of from about 30 to about 35 mole percent of recurring unit I, from about 30 to about 35 mole percent of recurring unit II, from about 10 to about 15 mole percent of recurring unit III, from about 20 to about 30 mole percent of recurring unit IV, and from about 10 to about 15 mole percent of recurring unit V.

Although the polymers produced by the process of this invention are particularly well suited for extrusion and co-extrusion applications such as the production of fiber, film, sheet, blow molded articles and the like, they may also be used in the production of injection molded parts.

If desired, compositions containing the subject polymers may contain one or more additional optional components such as for example, colorants, lubricants, processing aids, stabilizers, fillers, reinforcing agents, and the like. Fillers and reinforcing agents are not typically present in compositions used in fiber and film applications.

Due to their ability to be stretched at relatively low temperatures, the subject polymers are particularly well suited for use as barrier layers in the production of multilayer laminates, in particular blown films and containers, allowing fabricators to orient conventional thermoplastics used in the multilayer films for better strength and to obtain better oxygen and moisture barrier resistance with a thinner barrier layer made from the subject LCPs. Blown films and containers of interest include multilayer laminates having a polyolefin/barrier layer/polyolefin structure, wherein one or more intermediate layers, such as adhesive layers, are optionally interposed between the barrier and polyolefin layers.

Polyolefins commonly used in such multilayer laminates are polyolefin homopolymers and copolymers, for example polyethylene, polypropylene, ethylene vinyl acetate, and the like. The polyolefin of choice varies depending upon the end-use application of interest. In addition, an adhesive layer may also be used to adhere the polyolefin to the LCP. Any suitable adhesive material may be used as the adhesive layer, including but not limited to, ethylene-maleic anhydride copolymer, ethylene-methyl acrylate copolymer, ethylene-methyl acrylate copolymer grafted with maleic anhydride, ethylene-methyl acrylate-maleic acid terpolymer, ethylene-glycidyl methacrylate copolymer, ethylene-methyl acrylate-glycidyl methacrylate terpolymer, ethylene-methyl methacrylate-acrylic acid terpolymer, ethylene-vinyl acetate copolymer, an alkoxysilane modified ethylene-ethylacrylate copolymer, ethylene-acrylic acid copolymer, and a blend of polypropylene grafted with maleic anhydride with a dimer based polyamide.

Also of interest are multilayer laminates made with polyesters such as those having a polyalkylene terephthalate/barrier layer/polyalkylene terephthalate structure, where one or more intermediate layers are optionally interposed between the barrier and polyester layers. Polyalkyene terephthalates of particular interest in the production of such laminates include polyethylene terepthalate and polybutylene terephthalate. Also, an adhesive layer may be used to adhere the polyester to the LCP. Any suitable adhesive material may be used as the adhesive layer, including but not limited to polyester polyurethane, polyether polyurethane, polyester elastomer, and a polyether elastomer.

Another thermoplastic that may also be used as a layer with the subject polymer are polyamides such as nylon.

In multilayer laminates, the thickness of the barrier layer will typically range from 1 to 25 microns, depending upon the particular end use application.

As discussed previously, a major advantage of these laminates is that they can be stretched at temperatures typically used to stretch conventional thermoplastics (e.g., 120° C. to 160° C.). The stretching of the laminate orients the conventional thermoplastic polymer and improves the strength of the laminate. Conventional LCPs are typically not used in oriented multilayer laminates because of their inability to be stretched below their molten state.

One application for which stretchable liquid crystal polymers are especially suitable is the production of fibers such as monofilaments, multifilaments and bicomponent fibers using conventional fiber forming equipment.

Particularly, stretchable liquid crystal polymers may be used as at least one component in a bicomponent fiber. Bicomponent fibers are well known and may be defined as a fiber having at least two distinct cross-sectional domains respectively formed from polymers having different relative viscosities. The distinct domains may be formed by at least two different polymers, or the same polymer class having different relative viscosities. Bicomponent fibers are intended to include, but are not limited to core and sheath fiber structures, side by side fiber structures, tipped fiber structures, micro-denier structures and mixed fiber structures. These types of bicomponent fiber structures are described in U.S. Pat. No. 6,074,590, herein incorporated by reference.

Any type of stretchable liquid crystal polymer may be used in the bicomponent fiber. Preferably, the stretchable liquid crystal polymer is wholly aromatic, and more preferably is a stretchable liquid crystal polymer of the present invention with recurring units I, II, III, IV and V.

Other preferred stretchable liquid crystal polymers are similar to those disclosed in U.S. Pat. No. 5,656,714, herein incorporated by reference. In this case, the polymer is comprised of recurring units I, II, III, IV and V, wherein recurring unit I is

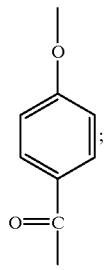

I recurring unit II is:

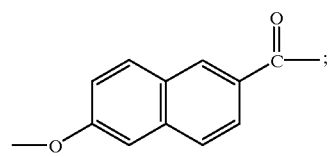

II recurring unit III is:

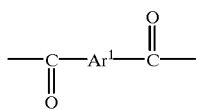

wherein is $Ar^1$ is selected from the group consisting of:

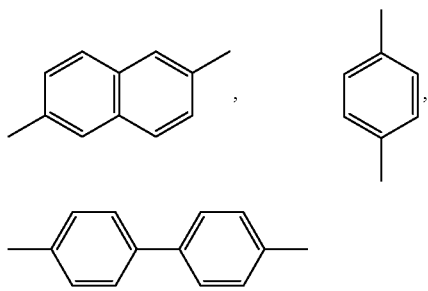

and mixtures thereof;

recurring unit IV is:

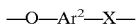

wherein $Ar^2$ is selected from the group consisting of:

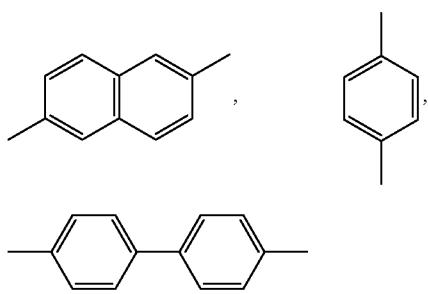

and mixtures thereof, and X is independently selected from the group consisting of O and $NR^2$ wherein $R^2$ is independently selected from the group consisting of hydrogen and a $C_1$ to $C_6$ alkyl; and recurring unit V is:

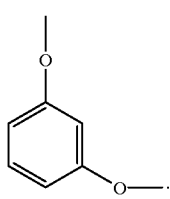

Preferably, recurring unit III would be

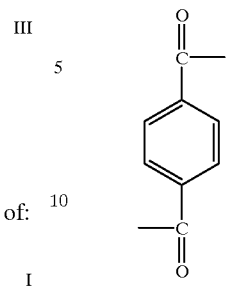

and recurring unit IV would be:

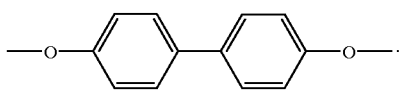

More preferably, the stretchable liquid crystal polymer would have recurring unit I present in an amount of about 20 to about 40 mole percent, recurring unit II present in an amount of 10 to about 40 mole percent, recurring unit III present in an amount of about 15 to about 30 mole percent, recurring unit IV present in an amount of about 5 to about 20 mole percent and recurring unit V present in an amount of about 5 to about 20 mole percent.

The stretchable liquid crystal polymers disclosed above are well suited to be used as one of the components in bicomponent fibers because of their ability to be stretched at temperatures used in a post extrusion orientation process. Bicomponent fibers using conventional thermoplastics are stretched in a post extrusion orientation process to orient the polymer and improve the strength of the fiber. Conventional liquid crystal polymers can not be used as one of the components in bicomponent fibers in a post orientation process because they can not be stretched at temperatures used to stretch conventional thermoplastics.

Any suitable type of fiber forming polymer may be used as one of the other components in the bicomponent fiber. Suitable classes of polymers that may be used, include but are not limited to polyamides, polyesters, acrylics, and polyolefins. Specifically, nylon, low and high density polyethylene, polypropylene and polyethylene terephthalate may be employed as one of the other components in a bicomponent fiber.

The bicomponent fibers are spun using conventional fiber-forming processes and equipment such as those described in U.S. Pat. Nos. 6,074,590; 5,948,528; 5,618,479; 5,162,074; 5,125,818; 5,344,297 and 5,445,884, herein incorporated by reference. Basically, spinning of bicomponent fibers involves co-extrusion of the two or more components to form single filaments in which the different components are brought together in a desired predetermined configuration.

As mentioned previously, the stretchable liquid crystal polymers may be used as any component in the bicomponent fiber. For example, in a core and sheath fiber, the stretchable liquid crystal polymer could be used as either the core or the sheath component. One such example would have the stretchable, liquid crystal polymer as the core and polyethylene terephthalate as the sheath. The stretchable liquid crystal polymer core component would contribute high modulus and tenacity as well as low elongation at room temperatures. Another example would have t he stretchable liquid crystal polymer as the sheath and polyethylene terephthalate as the core to improve harsh environment resistance capabilities because of the superior barrier properties of the stretchable liquid crystal polymer.

EXAMPLES

The following examples are presented to further illustrate this invention. The examples are not, however, intended to limit the invention in any way.

Examples 1 to 24 and Comparative Examples $C_1$ to $C_{10}$

To a 3-necked cylindrically shaped flask equipped with a stainless steel "C"-shaped agitator, gas inlet tube, thermocouple, distilling trap and Vigreux column attached to a condenser and receiver were added:

414 grams p-hydroxybenzoic acid
564 grams 6-hydroxy-2-naphthoic acid
166 grams of terephthalic acid
166 grams of isophthalic acid
372 grams of 4,4'-biphenol
1051.7 grams of acetic anhydride
0.21 grams of potassium acetate (60 ppm)

The flask was purged of oxygen by evacuation and flushing with dried nitrogen and immersed into an electrically heated fluidized sand bath. The contents of the flask were heated to ~150° C. while stirring at 75 rpm to acetylate hydroxyl groups. Temperature was raised from 150° to 220° C. over a period of 70 minutes to distill by-product acetic acid. Polymerization commenced at 220° C. and batch temperature was raised to 340° C. over a period of 130 minutes. During this time acetic acid that evolved was removed by distillation. After a 30 minute hold time at 340° C., vacuum was applied, and the pressure gradually reduced to ~5 mm Hg over a period of 20 minutes. The vacuum as maintained until the torque required to maintain agitator speed reached the target value necessary to give the desired melt viscosity. At the target torque the vacuum was discontinued and the flask brought to atmospheric pressure with dry nitrogen.

This process produced a polyester having an inherent viscosity (I.V.) of 4.3 dl/g, measured at 25° C. as a 0.1% by weight solution of polymer in a mixture of equal volumes of pentafluorophenol and hexafluorisopropanol. The melt viscosity was ~1500 poise at a shear rate of 1000 $sect^{-1}$, measured at 270° C. in a capillary rheometer using an orifice 1 mm in diameter and 20 mm long.

DSC (20° C./min. heating rate) indicated that the polymer had a Tg of 115° C.

Additional polymers were made and tested following a similar procedure. Table 1 lists the various Examples and Comparative Examples together with the mole percentages of the reactant monomers employed. Abbreviations are as follows:

"p-HBA" means p-hydroxybenzoic acid;
"HNA" means 6-hydroxy-2-naphthoic acid;
"TA" means terephthalic acid;
"NDA" means 2,6-naphthalene dicarboxylic acid;
"BP" means 4.4'-biphenol;
"HQ" means hydroquinone;
"IA" means isophthalic acid;
"m-HBA" means m-hydroxybenzoic acid;
"m-AP" means m-aminophenol; and
"m-ABA" means m-aminobenzoic acid.

All polymerizations were conducted in the presence of 60 ppm potassium acetate, using sufficient acetic anhydride to completely acetylate the hydroxyl and amino groups present.

Hot stage microscopy with polarized light confirmed that all of the polymers were optically anisotropic. The polymers contained molar quantities of recurring units that corresponded to the molar charge of the reactant monomers. I.V., M.V., and $T_g$ data for the polymers (measured as described above) are reported in Table 2. Excluding those polymers for which a $T_m$ is reported, the polymers were amorphous.

TABLE 1

| | REACTANT MONOMERS (Mole %) | | | | | | | | | |
|---|---|---|---|---|---|---|---|---|---|---|
| Example | p-HBA | HNA | TA | NDA | BP | HQ | IA | m-HBA | m-AP | m-ABA |
| 1 | 30 | 30 | 10 | — | 20 | — | 10 | — | — | — |
| 2 | 30 | 30 | 7.5 | — | 20 | — | 12.5 | — | — | — |
| 3 | 35 | 35 | 5 | — | 15 | — | 10 | — | — | — |
| 4 | 25 | 25 | 10 | — | 25 | — | 15 | — | — | — |
| 5 | 40 | 20 | 10 | — | 20 | — | 10 | — | — | — |
| 6 | 20 | 40 | 10 | — | 20 | — | 10 | — | — | — |
| 7 | 30 | 30 | 15 | — | 15 | — | — | 10 | — | — |
| 8 | 20 | 40 | 15 | — | 15 | — | — | 10 | — | — |
| 9 | 30 | 30 | 12.5 | — | 12.5 | — | — | 15 | — | — |
| 10 | 35 | 35 | 10 | — | 10 | — | — | 10 | — | — |
| 11 | 30 | 30 | 20 | — | 10 | — | — | — | 10 | — |
| 12 | 30 | 30 | 20 | — | 5 | — | — | — | 15 | — |
| 13 | 20 | 40 | 20 | — | 10 | — | — | — | 10 | — |
| 14 | 40 | 20 | 20 | — | 10 | — | — | — | 10 | — |
| 15 | 35 | 35 | 15 | — | 7.5 | — | — | — | 7.5 | — |
| 16 | 25 | 25 | 25 | — | 12.5 | — | — | — | 12.5 | — |
| 17 | 30 | 30 | 12.5 | — | 12.5 | — | — | — | — | 15 |
| 18 | 30 | 30 | 15 | — | 15 | — | — | — | — | 10 |
| 19 | 20 | 40 | 15 | — | 15 | — | — | — | — | 10 |
| 20 | 40 | 20 | 15 | — | 15 | — | — | — | — | 10 |
| 21 | 35 | 35 | 10 | — | 10 | — | — | — | — | 10 |
| 22 | 25 | 25 | 20 | — | 20 | — | — | — | — | 10 |
| 23 | 30 | 30 | 10 | — | 10 | 10 | 10 | — | — | — |
| 24 | 40 | 20 | — | 10 | 20 | — | 10 | — | — | — |
| C1 | 30 | 30 | 20 | — | 20 | — | — | — | — | — |
| C2 | 30 | 30 | 15 | — | 20 | — | 5 | — | — | — |

TABLE 1-continued

| | REACTANT MONOMERS (Mole %) | | | | | | | | | |
|---|---|---|---|---|---|---|---|---|---|---|
| Example | p-HBA | HNA | TA | NDA | BP | HQ | IA | m-HBA | m-AP | m-ABA |
| C3 | 35 | 35 | 10 | — | 15 | — | 5 | — | — | — |
| C4 | 30 | 30 | 17.5 | — | 17.5 | — | — | 5 | — | — |
| C5 | 40 | 20 | 15 | — | 15 | — | — | 10 | — | — |
| C6 | 25 | 25 | 20 | — | 20 | — | — | 10 | — | — |
| C7 | 20 | 20 | 20 | — | 20 | — | — | 20 | — | — |
| C8 | 20 | 20 | 25 | — | 25 | — | — | 10 | — | — |
| C9 | 30 | 30 | 20 | — | 15 | — | — | — | 5 | — |
| C10 | 30 | 30 | 17.5 | — | 17.5 | — | — | — | — | 5 |

The polymers were melt spun into tapes using a Micromelt™ apparatus. The apparatus was equipped with a 0.127 mm by 6.35 mm die. Melt temperatures varied between about 250–300° C. depending upon the melt characteristics of the sample. Throughput rates were 0.45 cc/min; take-up roller speeds were 2 rpm; and pack pressures ranged from about 100 kg/cm² to about 290 kg/cm², depending upon the $T_g$ (or $T_m$) of the polymer. The resulting tapes had an approximate thickness of 0.05 mm and a width of about 6 mm.

Five test specimens, each 12.7 cm in length were cut from each tape. The thickness of the specimens was measured to the nearest 0.0025 mm and the width to the nearest 0.25 mm. Each specimen was placed in a preheated Instron oven, allowed 6 minutes to come to temperature and then tested on an Instron type universal tester (equipped with a thermal chamber), set to a test temperature of 150° C. (or a temperature approximately 40° C. above Tg, for polymers having higher $T_g$ values). The gauge length was set at 25 mm and the crosshead speed was set at 50.8 m/min. The % break strain was calculated at the break point. The % break strain is reported in Table 2 as the average of the data for the five specimens tested. Standard deviations are also provided.

TABLE 2

| | TESTING DATA | | | | |
|---|---|---|---|---|---|
| EXAMPLE | I.V. (dl/g) | M.V. (poise) | BREAK STRAIN, % Avg./Std. Dev. | TEST TEMP. (° C.) | Tg (° C.) |
| 1 | 4.3 | 1548 | 520/220 | 150 | 115 |
| 2 | 3.5 | 1557 | 340/120 | 150 | 114 |
| 3 | 3.5 | 1474 | 360/90 | 150 | 112 |
| 4 | 2.6 | 1555 | 330/70 | 150 | 118 |
| 5 | 4.6 | 1928 | 280/80 | 150 | 113 |
| 6 | 3.9 | 1615 | 240/80 | 150 | 117 |
| 7 | 4.3 | 1586 | 110/30 | 150 | 109 |
| 8 | 3.7 | 1473 | 190/60 | 150 | 113 |
| 9 | 2.7 | 1648 | 190/30 | 150 | 109 |
| 10 | 3.8 | 1507 | 350/140 | 150 | 108 |
| 11 | 1.6 | 1527 | 260/20 | 170 | 132 |
| 12 | 1.4 | 2615 | 160/40 | 175 | 142 |
| 13 | 2.1 | 2137 | 270/70 | 170 | 134 |
| 14 | 2.0 | 1772 | 210/10 | 175 | 133 |
| 15 | 2.5 | 2570 | 190/10 | 165 | 125 |
| 16 | 1.7 | 1805 | 180/20 | 180 | 139 |
| 17 | 2.3 | 3041 | 300/50 | 185 | 145 |
| 18 | 2.8 | 2115 | 430/90 | 175 | 137 |
| 19 | 2.5 | 1430 | 910/110 | 175 | 136 |
| 20 | 2.6 | 1691 | 480/80 | 175 | 136 |
| 21 | 2.5 | 1667 | 510/60 | 175 | 133 |
| 22 | 2.2 | 826 | 160/50 | 170 | 138 |
| 23 | 3.6 | 1224 | 820/160 | 150 | 110 |
| 24 | 4.4 | 1159 | 980/40 | 150 | 111 |

TABLE 2-continued

| | TESTING DATA | | | | |
|---|---|---|---|---|---|
| EXAMPLE | I.V. (dl/g) | M.V. (poise) | BREAK STRAIN, % Avg./Std. Dev. | TEST TEMP. (° C.) | Tg (° C.) |
| C1 | 9.5 | 2592 | 2.3/0.2 | 150 | $T_m$ of 250 |
| C2 | 6.7 | 1899 | 20/10 | 150 | 115 |
| C3 | 5.9 | 1778 | 90/10 | 150 | 114 |
| C4 | 9.8 | 1661 | 3/0.3 | 150 | 114 ($T_m$ of 239) |
| C5 | 4.1 | 1536 | 40/20 | 150 | 108 ($T_m$ of 219) |
| C6 | 4.0 | 2338 | 30/20 | 150 | 112 |
| C7 | — | 3421 | not spinnable | 150 | 115 |
| C8 | — | High | not spinnable | 150 | 116 |
| C9 | 3.7 | 1297 | 50/20 | 165 | 125 ($T_m$ of 227) |
| C10 | 3.3 | 1083 | 60/10 | 170 | 129 |

The polymer of Example 1 was extruded into a film 25 microns thick and the resulting film was tested for oxygen and moisture permeability. Test conditions and permeability rates were as follows:

Oxygen Transmission at 23° C.

@ 0% relative humidity - 1.35 cc - 25 $\mu/m^2/24$ hr./atm.
@ 100% relative humidity - 1.27 cc - 25 $\mu/m^2/24$ hr./atm.

Water Transmission at 37.8° C.

0.398 $g/m^2/24$ hr.

The data demonstrates that a film made from the polymer of Example 1 had good barrier properties, in terms of oxygen and water permeability.

Examples 26–27 and Comparative Example C11

Multilayer Laminates

Multilayer blown films were prepared using as a barrier layer the polymer of Example 1. Film Examples 26 and 27 were prepared on a three extruder blown film line having a low density polyethylene (LDPE)/tie layer/barrier layer/tie layer/LDPE structure. The tie or adhesive layer was an ethylene-glycidyl methacrylate copolymer. These films were prepared ark using blow up ratios of about 2:1. The thickness of the films and the LCP barrier layer are shown in Tables 3 and 4.

Comparative Example C11 is a single layer film with no LCP barrier layer and composed only of LDPE. This sample was prepared using a blow-up ratio of 2:1.

The films were tested for oxygen permeability at 23° C. and relative humidity levels of 0% and 100%. Oxygen and water vapor permeability data are summarized in Tables 3 and 4.

TABLE 3

| FILM Example | TOTAL THICKNESS (MICRONS) | BARRIER MATERIAL | BARRIER LAYER THICKNESS (MICRONS) | OXYGEN PERMEABILITY @ 23° C. (cc-25 μm/m² day atm) | |
|---|---|---|---|---|---|
| | | | | @ 0% Relative Humidity | @ 100% Relative Humidity |
| 26 | 35.5–37.5 | Polymer 1 | 5.0 | 11.6 | 10.5 |
| 27 | 40.0–44.5 | Polymer 1 | 2.5 | 23.6 | 22.6 |
| C11 | 36.5–40.0 | None | — | 6929 | 6774 |

TABLE 4

| FILM Example | TOTAL THICKNESS (MICRONS) | BARRIER MATERIAL | BARRIER LAYER THICKNESS (MICRONS) | WATER VAPOR PERMEABILITY @ 37.8° C. and @ 100% Relative Humidity (g-25 μm/m² day atm) |
|---|---|---|---|---|
| 26 | 35.1 | Polymer 1 | 5.0 | 43.9 |
| 27 | 40.2–42.2 | Polymer 1 | 2.5 | 85.1 |
| C11 | 36.5–39.7 | None | — | 295 |

What is claimed is:

1. A bicomponent fiber wherein at least one component of said bicomponent fiber is a stretchable liquid crystal polymer.

2. The bicomponent fiber of claim 1 wherein said stretchable liquid crystal polymer is wholly aromatic.

3. The bicomponent fiber of claim 2 wherein said stretchable liquid crystal polymer is comprised of recurring units I, II, III, IV and V, wherein recurring unit I is

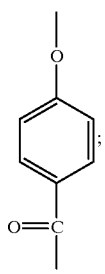

I recurring unit II is:

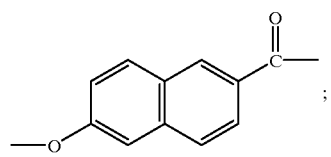

II recurring unit III is:

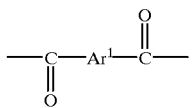

III wherein is $Ar^1$ is selected from the group consisting of:

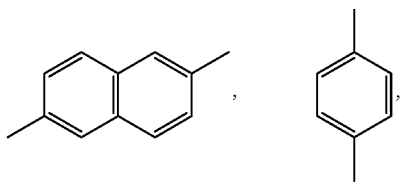

and mixtures thereof;

recurring unit IV is:

—O—$Ar^2$—X—

IV wherein $Ar^2$ is selected from the group consisting of:

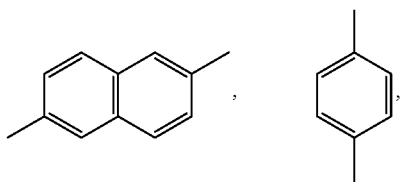

and mixtures thereof, and X is independently selected from the group consisting of O and $NR^2$ wherein $R^2$ is independently selected from the group consisting of hydrogen and a $C_1$ to $C_6$ alkyl; and recurring unit V is a formula selected from the group consisting of:

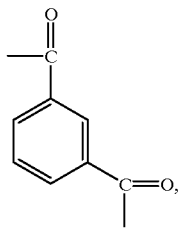

(Va)

-continued

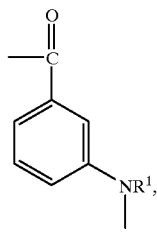
(Vb)

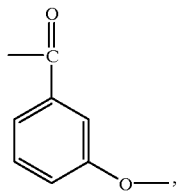
(Vc)

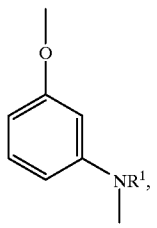
(Vd)

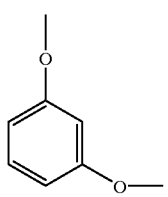
(Ve)

and mixtures thereof, wherein R¹ is independently selected from the group consisting of hydrogen and $C_1$ to $C_6$ alkyl.

4. The bicomponent fiber of claim 3 wherein recurring unit I is present in an amount of from about 15 to about 60 mole percent, recurring unit II is present in an amount of from about 15 to about 60 mole percent, recurring unit III is present in an amount of from about 5 to about 20 mole percent, recurring unit IV is present in an amount of from about 5 to about 30 mole percent, and recurring unit V is selected from the group consisting of V(a), V(b), V(c) and (Vd) and is present in an amount of from about 7 to about 15 mole percent and wherein:

(a) recurring units I and II combined are present in an amount of from about 50 to about 75 mole percent and
(b) the polymer contains at least about 5 mole percent of recurring units of the formula:

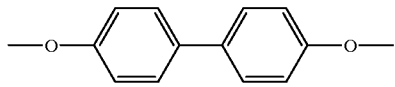

with the proviso that recurring unit II is present in an amount of at least about 30 mole percent, if and when the polymer also contains:

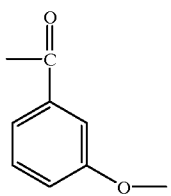

in combination with a total from 0 to about 5 mole percent of units selected from the group consisting of units (Va), (Vb) and (Vd) and mixtures thereof.

5. The bicomponent fiber of claim 4 wherein said recurring unit III is

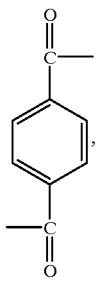

and recurring unit IV is

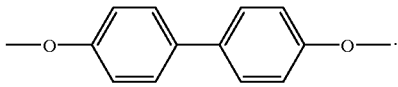

6. The bicomponent fiber of claim 5 wherein said recurring group V is selected from the group consisting of formulas: (Va), (Vc) and mixtures thereof.

7. The bicomponent fiber of claim 5 wherein said recurring group V is (Va).

8. The bicomponent fiber of claim 7 wherein said recurring unit I is present in the amount of from about 30 to about 35 mole percent, recurring unit II is present in the amount of from about 30 to about 35 mole percent, recurring unit III is present in the amount of from about 10 to about 15 mole percent, recurring unit IV is present in the amount of from about 20 to about 30 mole percent, and recurring unit V is present in the amount of from about 10 to about 15 mole percent.

9. The bicomponent fiber of claim 3 wherein said recurring unit V has the formula

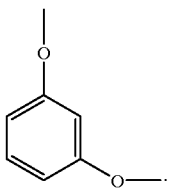
(Ve)

10. The bicomponent fiber of claim 9 wherein said recurring unit III is

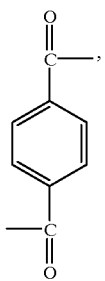

and recurring unit IV is

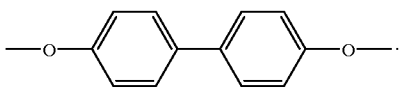

11. The bicomponent fiber of claim 10 wherein said recurring unit I is present in an amount of about 20 to about 40 mole percent, recurring unit II is present in an amount of 10 to about 40 mole percent, recurring unit III is present in an amount of about 15 to about 30 mole percent, recurring unit IV is present in an amount of about 5 to about 20 mole percent and recurring unit V is present in an amount of about 5 to about 20 mole percent.

12. The bicomponent fiber of claim 1 wherein said fiber has a structure selected from the group consisting of: core and sheath fiber structure, side by side fiber structure, tipped fiber structure, micro-denier structure and mixed fiber structure.

13. The bicomponent fiber of claim 12 wherein one of the components is selected from the group consisting of: nylon, low or high density polyethylene, polypropylene and polyethylene terephthalate.

14. The bicomponent fiber of claim 12 wherein said structure is a core and sheath fiber structure.

15. The bicomponent fiber of claim 14 wherein said stretchable liquid crystal polymer is the core and polyethylene terephthalate is the sheath, or said stretchable liquid crystal polymer is the sheath and polyethylene terephthalate is the core.

16. The bicomponent fiber of claim 1 wherein said fiber is stretched at a temperature of from about 120° C. to about 160° C.

17. A multilayer laminate comprising a layer of a thermoplastic and a layer of a liquid crystal polymer wherein said liquid crystal polymer is comprised of recurring units I, II, III, IV and V, wherein recurring unit I is

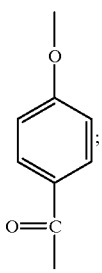

recurring unit II is:

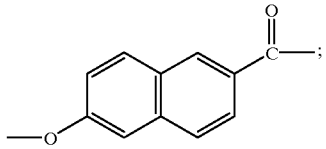

recurring unit III is:

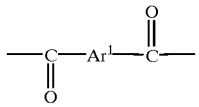

wherein is $Ar^1$ is selected from the group consisting of:

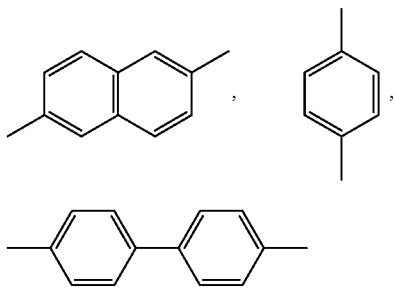

and mixtures thereof;

recurring unit IV is:

—O—$Ar^2$—X—  IV wherein $Ar^2$ is selected from the group consisting of:

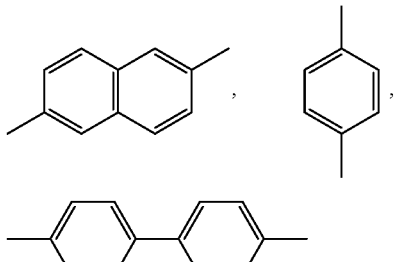

and mixtures thereof, and X is independently selected from the group consisting of O and $NR^2$ wherein $R^2$ is independently selected from the group consisting of hydrogen and a $C_1$ to $C_6$ alkyl; and recurring unit V is a formula selected from the group consisting of:

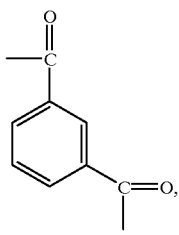
(Va)

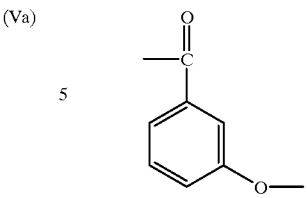
(Vb)

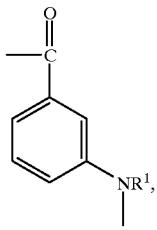
(Vc)

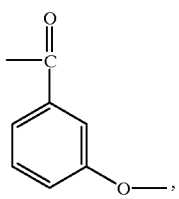
(Vd)

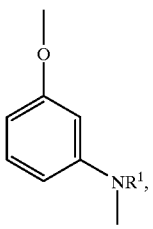

and mixtures thereof, wherein $R^1$ is independently selected from the group consisting of hydrogen and $C_1$ to $C_6$ alkyl; and wherein recurring unit I is present in an amount of from about 15 to about 60 mole percent, recurring unit II is present in an amount of from about 15 to about 60 mole percent, recurring unit III is present in an amount of from about 5 to about 20 mole percent, recurring unit IV is present in an amount of from about 5 to about 30 mole percent, and recurring unit V is selected from the group consisting of V(a), V(b), V(c) and (Vd) and is present in an amount of from about 7 to about 15 mole percent and wherein:

(a) recurring units I and II combined are present in an amount of from about 50 to about 75 mole percent and (b) the polymer contains at least about 5 mole percent of recurring units of the formula:

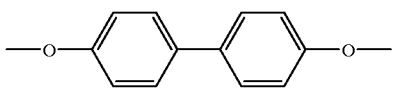

with the proviso that recurring unit II is present in an amount of at least about 30 mole percent, if and when the polymer also contains:

in combination with a total from 0 to about 5 mole percent of units selected from the group consisting of units (Va), (Vb) and (Vd) and mixtures thereof.

18. The laminate of claim 17 wherein recurring unit III is

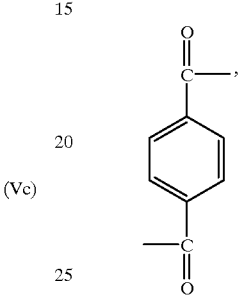

and recurring unit IV is

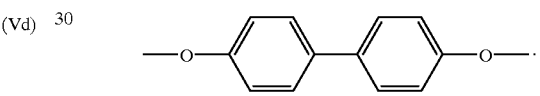

19. The laminate of claim 18 wherein recurring group V is selected from the group consisting of formulas: (Va), (Vc) and mixtures thereof.

20. The laminate of claim 18 wherein sad recurring group V is (Va).

21. The laminate of claim 20 wherein unit I is present in the amount of from about 30 to about 35 mole percent, recurring unit II is present in the amount of from about 30 to about 35 mole percent, recurring unit III is present in the amount of from about 10 to about 15 mole percent, recurring unit IV is present in the amount of from about 20 to about 30 mole percent, and recurring unit V is present in the amount of from about 10 to about 15 mole percent.

22. The laminate of claim 17 further comprising an adhesive layer.

23. The laminate of claim 22 wherein said adhesive layer is made from materials selected from the group consisting of: ethylene-maleic anhydride copolymer, ethylene-methyl acrylate copolymer, ethylene-methyl acrylate copolymer grafted with maleic anhydride, ethylene-methyl acrylate-maleic acid terpolymer, ethylene-glycidyl methacrylate copolymer, ethylene-methyl acrylate-glycidyl methacrylate terpolymer, ethylene-methyl methacrylate-acrylic acid terpolymer, ethylene-vinyl acetate copolymer, an alkoxysilane modified ethylene-ethylacrylate copolymer, ethylene-acrylic acid copolymer, a blend of polypropylene grafted with maleic anhydride with a dimer based polyamide polyester, a polyurethane, a polyether polyurethane, a polyester elastomer, and a polyether elastomer.

24. The laminate of claim 17 wherein said thermoplastic is selected from the group consisting of: polyethylene, polypropylene, ethylene vinyl acetate, nylon and polyalkylene terephthalate.

25. The laminate of claim 17 wherein said laminate is stretched at a temperature of from about 120° C. to about 160° C.

26. A liquid crystal polymer comprised of recurring units I, II, III, IV and V, wherein recurring unit I is

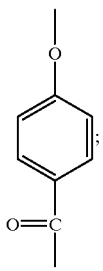

I recurring unit II is:

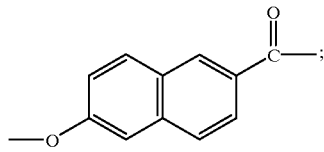

II recurring unit III is:

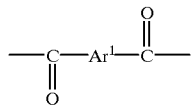

III wherein is Ar¹ is selected from the group consisting of:

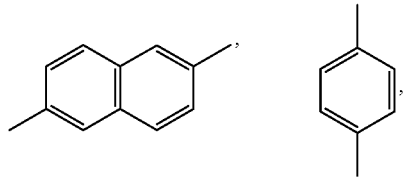

and mixtures thereof;
recurring unit IV is:

IV wherein Ar² is selected from the group consisting of:

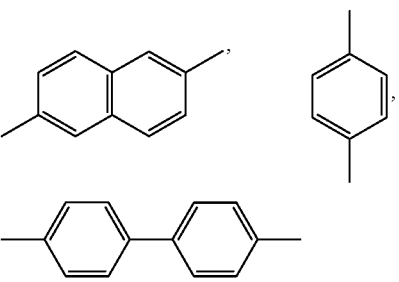

and mixtures thereof, and X is independently selected from the group consisting of O and $NR^2$ wherein $R^2$ is independently selected from the group consisting of hydrogen and a $C_1$ to $C_6$ alkyl; and recurring unit V is a formula selected from the group consisting of:

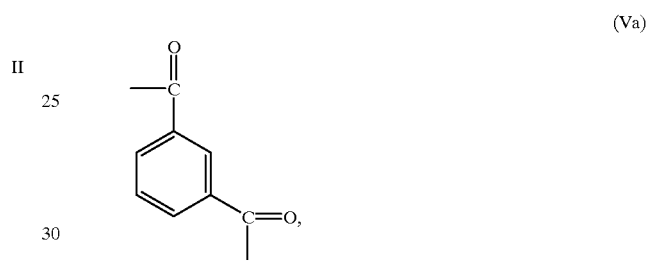

(Va)

(Vb)

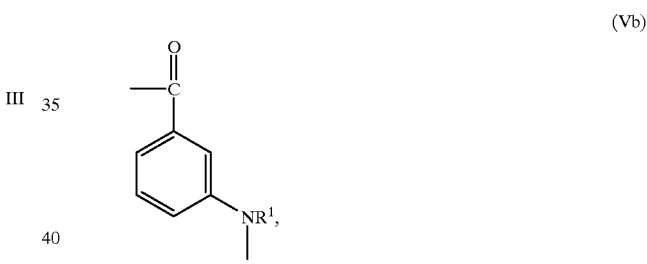

(Vc)

(Vd)

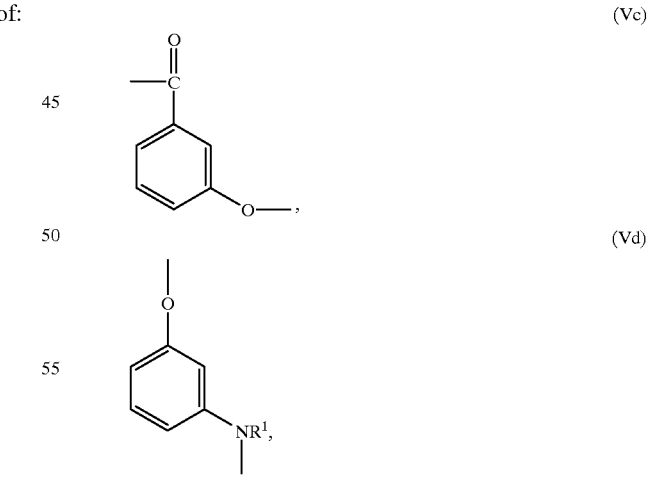

and mixtures thereof, wherein $R^1$ is independently selected from the group consisting of hydrogen and $C_1$ to $C_6$ alkyl; and wherein recurring unit I is present in an amount of from about 15 to about 60 mole percent, recurring unit II is present in an amount of from about 15 to about 60 mole percent, recurring unit III is present in an amount of from about 5 to about 20 mole percent, recurring unit IV is present in an amount of from about 5 to about 30 mole percent, and recurring unit V is selected from the group consisting of V(a), V(b), V(c) and (Vd) and is present in an amount of from about 7 to about 15 mole percent and wherein:
(a) recurring units I and II combined are present in an amount of from about 50 to about 75 mole percent and
(b) the polymer contains at least about 5 mole percent of recurring units of the formula:

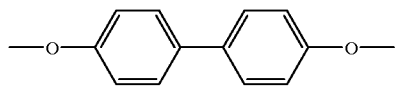

with the proviso that recurring unit II is present in an amount of at least about 30 mole percent, if and when the polymer also contains:

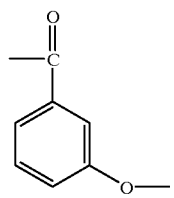

in combination with a total from 0 to about 5 mole percent of units selected from the group consisting of units (Va), (Vb) and (Vd) and mixtures thereof.

27. The polymer of claim 26 wherein recurring unit III is

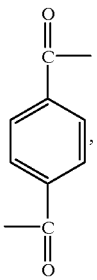

and recurring unit IV is

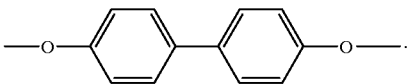

28. The polymer of claim 27 wherein recurring group V is selected from the group consisting of formulas: (Va), (Vc) and mixtures thereof.

29. The polymer of claim 27 wherein said recurring group V is (Va).

30. The polymer of claim 29 wherein unit I is present in the amount of from about 30 to about 35 mole percent, recurring unit II is present in the amount of from about 30 to about 35 mole percent, recurring unit III is present in the amount of from about 10 to about 15 mole percent, recurring unit IV is present in the amount of from about 20 to about 30 mole percent, and recurring unit V is present in the amount of from about 10 to about 15 mole percent.

* * * * *